United States Patent

[11] 3,621,175

| [72] | Inventors | Peter Dominic Prevett<br>Stoneham;<br>Theodore Joseph Morin, Needham, both of Mass. |
|---|---|---|
| [21] | Appl. No. | 761,032 |
| [22] | Filed | Sept. 20, 1968 |
| [45] | Patented | Nov. 16, 1971 |
| [73] | Assignee | Industrial Magnetics, Inc.<br>Canton, Mass. |

[54] CONTINUOUS WELDING
4 Claims, 2 Drawing Figs.

[52] U.S. Cl............................................. 219/9.5, 219/8.5, 219/149
[51] Int. Cl............................................. B23k 13/00
[50] Field of Search............................................. 219/7.5, 8.5, 9.5, 149, 150, 151, 152, 153, 154

[56] References Cited
UNITED STATES PATENTS

| 2,649,527 | 8/1953 | Chapman et al. | 219/9.5 X |
| 2,829,229 | 4/1958 | Metz | 219/7.5 X |
| 3,258,573 | 6/1966 | Morin et al. | 219/7.5 X |

Primary Examiner—J. V. Truhe
Assistant Examiner—Hugh D. Jaeger
Attorney—William W. Rymer ABSTRACT: Welding together two elements by placing their surfaces next to each other, moving them simultaneously along a path, heating successive zones of the elements at a station on the path and thereafter moving the successive zone through a zone of pulsed high magnetic field at another station.

CONTINUOUS WELDING

The invention relates to continuous welding.

Objects of the invention are to provide for continuous welding, particularly of pipes and inside liners, simply, reliably and inexpensively.

The invention features welding together two elements by placing surfaces of the elements next to each other, moving the elements along a path, heating successive zones of the elements as they successively move past a station on the path, and thereafter moving the successive zones through a zone of pulsed high magnetic field at another station. In preferred embodiments the elements are tubular and concentric, there is a conveyor for moving the elements, an induction heating coil and controlling circuitry, a magnetic welding coil and magnetic welding circuitry, a temperature sensor, and a feedback circuit connected to the sensor and induction heating coil controlling circuit for automatically controlling the heating coil, the coils and sensor being spaced along the path, the magnetic welding coil and circuitry being selected to cause the elements to be attracted toward each other within the coil, and the magnetic welding coil having a dimension along the path and a pulse repetition rate such that successive pulses weld over the entire mating surfaces of the elements.

Figure 1:
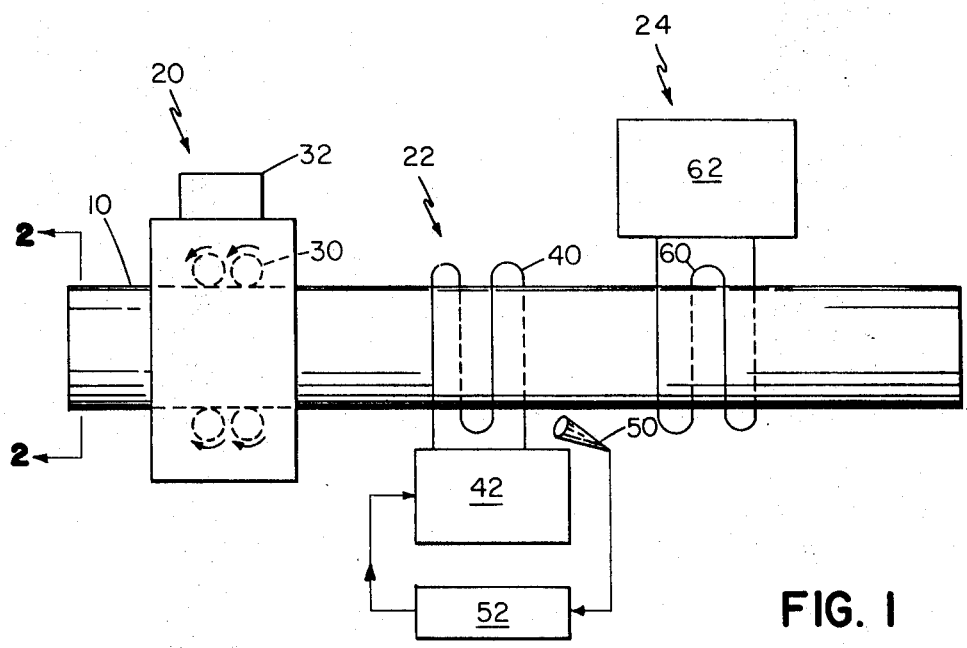
Figure 2:
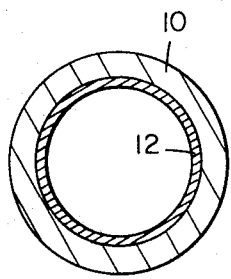

Other objects, features and advantages will appear from the following description of a preferred embodiment of the invention, taken together with the attached drawings thereof, in which:

FIG. 1 is a view, partially diagrammatic, of a pipe and liner and equipment embodying the invention; and FIG. 2 is a cross-sectional view of the pipe and liner along the line 2—2 of FIG. 1.

The drawings show a pipe 10 having an inside liner 12. The pipe is carbon steel with a wall thickness of 1/8 inch and an outside diameter of 2.3 inches. The liner is of stainless steel having a thickness of 35 mils and an outside diameter a slip fit in the inside diameter of the pipe.

FIG. 1 shows the pipe and liner, a conveyor assembly generally designated 20, a heating assembly generally designated 22, and a magnetic welding assembly generally designated 24.

Conveyor assembly 20 includes four rollers 30 engaging the outside surface of pipe 10 and rotatable to feed the pipe toward the heating and welding assemblies. A constant speed motor 32 is drivingly connected to the rollers to feed the pipe at a linear speed of 50 feet per minute.

Heating assembly 22 includes a heating coil 40 which surrounds the pipe. The heating coil is part of a 200 kilowatt induction heater 42 capable of heating the portion of the pipe and liner moving through the coil to a temperature of 2,500° F.

An optical pyrometer 50 adjacent the heated area of the pipe is connected to a feedback circuit 52 which controls the output of the induction heater 42.

Magnetic welding assembly 24 includes a welding coil 60 surrounding the pipe and liner adjacent heating coil 40. Welding coil 60 is about 1 inch wide and is connected to a magnetic welding control circuit 62. The welding control circuit includes a 560 microfarad capacitor bank rated at 5,000 volts and is capable of charging the capacitor bank and discharging it into the welding coil at a repetition rate of 10 times per second.

In operation, pipe and liner 10, 12 are fed by rollers 30 through heating coil 40 and welding coil 60 at a speed of 50 feet per minute, so that every mating circumference of the pipe and liner falls under the effect of the welding coil (since the welding coil is 1 inch wide and is activated 10 times a second, to cover 10 inches a second, or 50 feet per minute).

The pipe and liner are heated to a temperature of 2,500° F. while passing through heating coil 40. The feedback system shown assures that a proper temperature is achieved before the pipe passes into the welding coil. Optical pyrometer 50 senses the temperature of the pipe near the heater coil and transmits a signal to feedback network 52 for control of the output of induction heater 42.

After being heated to the proper temperature, the pipe and liner pass through welding coil 60. The capacitor bank is charged to 4,000 volts. The current pulse passing through coil 60 when the capacitor bank in welding control circuit 62 discharges causes magnetic forces to arise in the pipe and liner. Parameters defined by the welding coil and control circuit are chosen so that the current pulse has a characteristic frequency of 6 kilocycles creating an induced current in the pipe and liner having a skin depth of 1/4 inch. The magnetic forces generated in the pipe and liner cause them to be attracted toward each other, as shown, for example, in U.S. Pat. application Ser. No. 717,749, filed Apr. 1, 1968, and entitled "Welding Method," assigned to the same assignee as the present application. As set forth in detail in that "Welding Method" application, an induced current of skin depth greater than the thickness of one of two overlapping conductors (and preferably greater than the total overlapped thickness) causes currents to flow in the same direction in each conductor. These currents cause the conductors, here pipe 10 and liner 12, to be attracted, i.e., to be drawn radially toward each other.

Other embodiments will occur to those skilled in the art and are within the following claims.

What is claimed is:

1. Apparatus for welding together two elements having longitudinally extending surfaces next to each other comprising
 a conveyor for moving said elements simultaneously along a path,
 an induction heating coil and controlling circuitry, and
 a magnetic coil and magnetic welding circuitry,
 said coils being at spaced locations along said path whereby successive portions of said surfaces pass said heating coil and thereafter pass said magnetic coil.

2. The apparatus of claim 1 wherein said magnetic welding coil has a dimension along said path intermediate said coils such that successive pulses weld said surfaces together overall thereof.

3. The apparatus of claim 1 including a temperature sensor at a location along said path intermediate said coils and a feedback circuit connected to said temperature sensor and connected to said induction heating coil controlling circuitry for automatically controlling said induction heating coil.

4. The apparatus of claim 1 wherein said elements are tubular and concentric, the inside element having an outside surface next to the inside surface of the outside element.

UNITED STATES PATENT OFFICE
CERTIFICATE OF CORRECTION

Patent No. 3,621,175          Dated November 16, 1971

Inventor(s) Peter Dominic Prevett and Theodore Joseph Morin

It is certified that error appears in the above-identified patent and that said Letters Patent are hereby corrected as shown below:

Column 2, line 49, claim 2, after "path" delete

--intermediate said coils--.

Signed and sealed this 27th day of June 1972.

(SEAL)
Attest:

EDWARD M. FLETCHER, JR.          ROBERT GOTTSCHALK
Attesting Officer                Commissioner of Patents